(12) United States Patent
Kirwan

(10) Patent No.: US 6,985,693 B2
(45) Date of Patent: Jan. 10, 2006

(54) INTERACTIVE PICTURE BOOK WITH VOICE RECORDING FEATURES AND METHOD OF USE

(76) Inventor: Debra Giampapa Kirwan, 615 Carnation Ave., Corona Del Mar, CA (US) 92625

( * ) Notice: Subject to any disclaimer, the term of this patent is extended or adjusted under 35 U.S.C. 154(b) by 250 days.

(21) Appl. No.: 10/357,896

(22) Filed: Feb. 3, 2003

(65) Prior Publication Data

US 2003/0113696 A1    Jun. 19, 2003

Related U.S. Application Data

(63) Continuation-in-part of application No. 09/915,623, filed on Jul. 25, 2001, now Pat. No. 6,516,181.

(51) Int. Cl.
*G09B 5/00* (2006.01)

(52) U.S. Cl. ........................ 434/317; 434/308; 434/169

(58) Field of Classification Search ................ 434/167, 434/169.1, 78, 307 R–309, 317, 20, 362, 434/365, 180; 345/87, 169, 173; 235/462.01, 235/462.15; 360/74.1; 206/455; 396/429; 482/4

See application file for complete search history.

(56) References Cited

U.S. PATENT DOCUMENTS

| | | | |
|---|---|---|---|
| 4,021,932 A | * | 5/1977 | Lipps .......................... 434/317 |
| 4,636,881 A | * | 1/1987 | Brefka et al. ............... 360/74.1 |
| 4,791,741 A | | 12/1988 | Kondo |
| 4,884,974 A | | 12/1989 | DeSmet |
| 4,966,285 A | * | 10/1990 | Otake et al. ................ 206/455 |
| 4,990,092 A | | 2/1991 | Gummings |
| 5,174,759 A | * | 12/1992 | Preston et al. .............. 434/317 |
| 5,290,190 A | | 3/1994 | McClanahan |
| 5,359,374 A | | 10/1994 | Schwartz |
| 5,368,488 A | * | 11/1994 | Gentile ........................ 434/317 |
| 5,466,158 A | * | 11/1995 | Smith, III .................... 434/317 |
| 5,485,176 A | * | 1/1996 | Ohara et al. ................. 345/173 |
| 5,520,544 A | | 5/1996 | Manico et al. |
| 5,574,519 A | * | 11/1996 | Manico et al. .............. 396/429 |
| 5,575,659 A | * | 11/1996 | King et al. .................. 434/167 |
| 5,636,995 A | * | 6/1997 | Sharpe et al. ............... 434/317 |
| 5,765,129 A | | 6/1998 | Hyman et al. |
| 5,810,604 A | * | 9/1998 | Kopp et al. .................. 434/317 |
| 5,945,656 A | * | 8/1999 | Lemelson et al. ...... 235/462.01 |
| 6,064,855 A | * | 5/2000 | Ho .............................. 434/317 |
| 6,072,980 A | * | 6/2000 | Manico et al. .............. 434/317 |
| 6,167,233 A | * | 12/2000 | Gresser et al. .............. 434/308 |
| 6,201,947 B1 | * | 3/2001 | Hur et al. .................... 434/317 |
| 6,421,524 B1 | * | 7/2002 | Padgett ........................ 434/317 |
| 6,516,181 B1 | * | 2/2003 | Kirwan ........................ 434/317 |
| 6,525,706 B1 | * | 2/2003 | Rehkemper et al. .......... 345/87 |

(Continued)

*Primary Examiner*—Joe H. Cheng
(74) *Attorney, Agent, or Firm*—Gene Scott and Patent Law and Venture Group

(57) ABSTRACT

An apparatus comprises in combination a storybook and a separate audio recorder adapted for mounting on the storybook. The recorder may be used with any one of several storybooks by recording the storyline of each book by the purchaser for later playback by a child. Buttons corresponding to the several pages of the storybook are provided so that a child is able to correlate a button with each page to hear the story as well as read it. Dual recording devices may be played simultaneously wherein one may provide a background music or sound, while the other provides and audio representation of the text or whatever audio the user desires.

13 Claims, 2 Drawing Sheets

U.S. PATENT DOCUMENTS 6,830,187 B2 * 12/2004 Rathus et al. .......... 235/462.15
2001/0040560 A1 * 11/2001 Hur et al. ................... 434/317
2002/0019296 A1 * 2/2002 Freeman et al. ................ 482/4
2003/0082505 A1 * 5/2003 Frohlich et al. ............ 434/180

* cited by examiner

INTERACTIVE PICTURE BOOK WITH VOICE RECORDING FEATURES AND METHOD OF USE

RELATED APPLICATIONS

This is a continuation-in-part application of U.S. Pat. application Ser. No. 09/915,623, filed Jul. 25, 2001, now U.S. Pat. No. 6,516,181 B1, which is incorporated herein by reference.

INCORPORATION BY REFERENCE:

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to story books and voice recording devices and more particularly to a combination story book and voice recording device.

2. Description of Related Art

The following art defines the present state of this field:

Kondo, U.S. Pat. No. 4,791,741 describes a card or postal media which comprises a storage member to retain audio information picked up by a microphone, a sound generating member including a speaker, a mode selection signal producing member to allow either record or playback to be selected, a controller performing record or playback according to the mode selection signal from the mode selection signal producing member; converting the audio signal from the microphone from analog to digital and storing it in the storage member when the record mode is selected; retrieving stored information from the storage member, converting it from digital to analog, and outputting the analog signal to the sound generating member when the playback mode is selected, and a card board on which the microphone, speaker, and the other members are mounted.

DeSmet, U.S. Pat. No. 4,884,974 describes an interactive talking book and audio player assembly, the back cover of the book having an ROM module attached to its end margin in which is stored digitally recorded spoken texts corresponding to texts printed on pages of the book. Printed on the end margin of each book page that carries a printed text is a page-identifying binary bar code formed by reflective and non-reflective elements. Associated with the book is an audio player having a base inlet adapted to receive the end margin of the back cover and to bring the terminals of the ROM module into engagement with inlet contacts connecting the module to a speech unit for converting the digitally-recorded texts into audio signals which are amplified and reproduced. When the pages of the book are turned, they overlie the base inlet of the player, the bar code on the open page being then exposed to ambient light. The code elements in the code which are reflective direct the light toward an array of light sensors mounted above the inlet and those which are non-reflective do not, to produce binary signals indentifying the open page. The page-identifying signals are applied to a sensor interface and are transferred thereby to the speech unit which then acts to read-out from the ROM module the spoken text corresponding to the printed text on the open page whereby the reader of this text hears what he is reading.

Cummings, U.S. Pat. No. 4,990,092 describes a talking book including a power source, switches, voice chips and speaker, all of which are mounted within the book and act together to "read" the words written on pages of the book. The switches are pressure-sensitive types, and marked areas on the pages are pressed in order to activate the switches and the chips in order to produce words or other sounds.

McClanahan, U.S. Pat. No. 5,290,190 describes a talking book with a plurality of pages each having a switch operable from opposite sides of the page, with all of the audio components located other than on the page, e.g., in the binding. A switch may also be provided in the binding for a selective audio presentation without opening the book, and illumination means may be provided within the pages in addition to the audio.

Manico et al., U.S. Pat. No. 5,520,544 describes an interactive talking book and audio player assembly, the back cover of the book having an ROM module attached to its end margin in which is stored digitally recorded spoken texts corresponding to texts printed on pages of the book. Printed on the end margin of each book page that carries a printed text is a page-identifying binary bar code formed by reflective and non-reflective elements. Associated with the book is an audio player having a base inlet adapted to receive the end margin of the back cover and to bring the terminals of the ROM module into engagement with inlet contacts connecting the module to a speech unit for converting the digitally-recorded texts into audio signals which are amplified and reproduced. When the pages of the book are turned, they overlie the base inlet of the player, the bar code on the open page being then exposed to ambient light. The code elements in the code which are reflective direct the light toward an array of light sensors mounted above the inlet and those which are non-reflective do not, to produce binary signals indentifying the open page. The page-identifying signals are applied to a sensor interface and are transferred thereby to the speech unit which then acts to read-out from the ROM module the spoken text corresponding to the printed text on the open page whereby the reader of this text hears what he is reading.

Schwartz, U.S. Pat. No. 5,359,374 describes a still video image is placed within a frame or plaque and an associated audio stimulus is stored on a recording and playback unit. The recording and playback unit is self-contained and affixed to the frame to allow for instant and repeated playback of the audio stimulus when desired. Both the video image and the audio stimulus can be varied according to a user's desire. The portability of the frame and the recording and playback unit allow a user to record any audio event at the location and time that it occurs.

Hyman, U.S. Pat. No. 5,765,129 describes a recording and playback device that allows the user to record a desired message and then play back the message in either the order in which the message was recorded or in an order reversed from the order in which the message is recorded. The message is preferably stored in the proper, forward order and reversed only when reverse playback is desired. The message is re-recorded as desired, the previously recorded message being overwritten.

The prior art teaches the use of, so called "talking books" but does not teach a combination story book and detachable audio device for recording the storyline of each story book. The present invention fulfills these needs and provides further related advantages as described in the following summary.

SUMMARY OF THE INVENTION

The present invention teaches certain benefits in construction and use which give rise to the objectives described below.

An apparatus comprises in combination a storybook and a separate audio recorder adapted for mounting on the storybook. The recorder may be used with any one of several storybooks by recording the storyline of each book by the purchaser for later playback by a child. Buttons corresponding to the several pages of the storybook are provided so that a child is able to correlate a button with each page to hear the story as well as read it. Dual recording devices may be played simultaneously wherein one may provide a background music or sound, while the other provides an audio representation of the text or whatever audio the user desires.

A primary objective of the present invention is to provide an apparatus and method of use of such apparatus that provides advantages not taught by the prior art.

Another objective is to provide such an invention capable of enabling a young reader to hear as well as read a story in a storybook.

A further objective is to provide such an invention capable of enabling a young reader to hear a loved one read the storybook in absentia.

A still further objective is to provide such an invention capable of being used with alternate books.

A yet further objective is to provide such an invention capable of enabling a young reader to sing along with, and record over, a prerecorded music sound bite.

An important objective is to provide such an invention capable of playing two sound tracks simultaneously.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
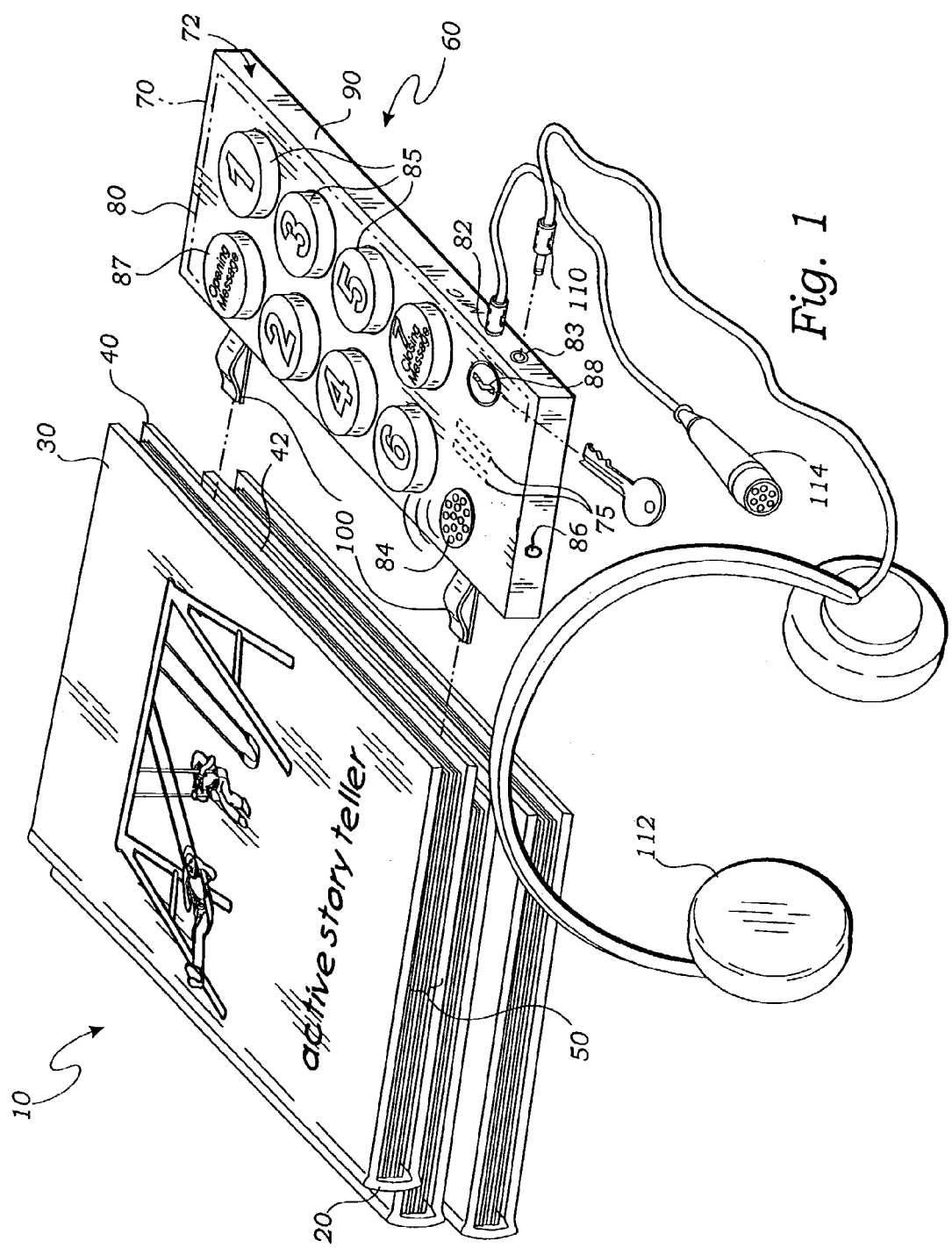
FIGS. 1 and 2 are perspective views of the preferred embodiment of the invention showing an audio device thereof detached and attached respectfully.

The above described drawing figures illustrate the invention in at least one of its preferred embodiments, which is further defined in detail in the following description.

The present invention is an apparatus comprising in combination a storybook 10 having a book binding 20 engaging a front 30 and a back 40 book covers and plural pages 50 positioned between the front and back book covers 30, 40. An audio recording and playback device (audio recorder 60) of the type in common use for remote telephone answering and such, is a second portion of the present invention and is particularly adapted to be attached and detached from the storybook 10 by any means whatsoever. As such the audio device 60 may be used with more than one storybook 10 and is adapted for such in that a new set of audio information may be recorded over an old set, and so on.

Figure 2:
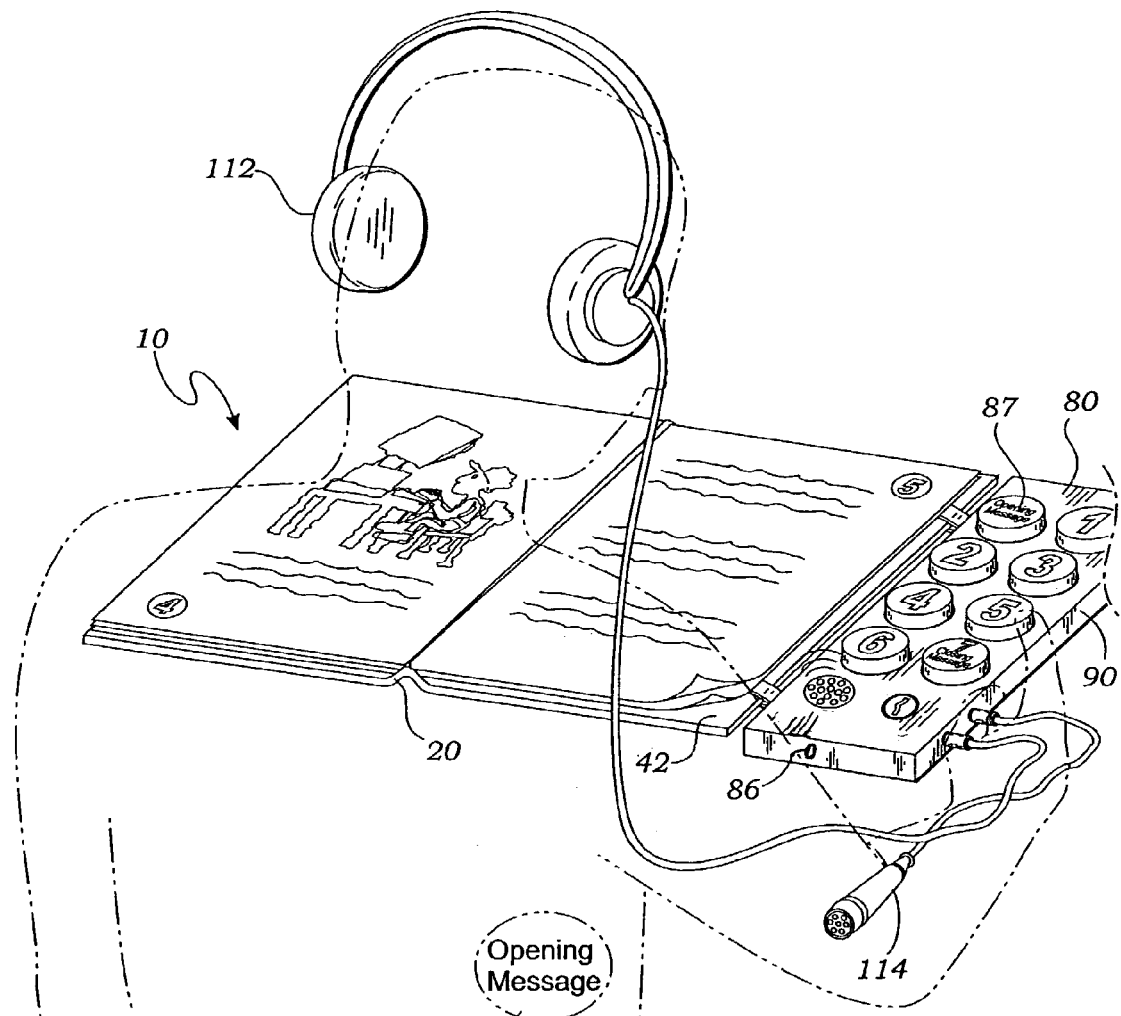

The audio recorder 60 provides an electronic circuit 70 having an audio (voice or music) information storing means 75, such as a solid state memory device, as for instance random access memory (RAM) devices within an enclosure 72 which may be made of molded plastic or similar construction. The enclosure 72 has an upwardly directed control surface 80 and a side surface 90 adjacent to the control surface 80 as is best seen in FIG. 1. These elements will be referred to as a (means for control). The audio recorder 60 further provides an engaging means 100, such as the pair of spring clips shown in FIG. 1. These are functional for removably engaging the audio recorder 60 with an edge 42 of the back one of the book covers 40. Alternatively, the audio recorder 60 might, just as well, be attached to the inside surface 42 of the back one of the book covers 40, if such a cover were to extend, for instance, in FIG. 2 to the right so that the audio recorder 60 might rest on it with Velcro® fastener material, or any other known fastener, such as a bonding agent, etc. When attached to a book 10, the audio recorder 60 is integral with the book 10 and becomes an operating part of the book as will be described below. The audio recorder 60 enables audio information recording and playback of a story illustrated on the pages 50 of the book 10. Such recording may be completed prior to sale of a commercial product, or it may be made spontaneously after it has been placed into the hands of the owner or user of the book. Alternately, one portion of the recorded material may be prerecorded, as for instance, background music, while a further portion is recorded "over" the music by the end user.

The means for control includes the electrical circuit 70, including a microphone circuit 82 for receiving the audio information and storing the audio information in the information storing means 75 as is well known in solid state voice recorders using RAM devices. Such a microphone circuit 82 may include an input lead 114 which is well known in the art for electrically connecting to, and receiving a remote microphone (not shown). A headphone circuit 83 is enabled for receiving a headphone jack 110 for directing the audio information to a headphone 112 as is well known in voice recorders and generally considered an optional part and use in the present invention. An audio output circuit 84 is adapted for presenting the audio information audibly through a speaker or similar common output component as is well known in voice recorders where a power amplifier drives the speaker. Plural operating buttons 85 visually correspond to the plural pages of the story book 10, as for instance by color or page number or letter, and are each enabled, through electrical circuit 70 for initiating a portion of the audio information playback corresponding to a portion of a story written on the corresponding one of the pages 50 of the storybook 10. Such enablement for partial playback via each one of the buttons 85 is well known in the art as for instance by simply initiating the start of playback of the information stored in one selected RAM device, out of several, in the circuit 70. The information storage means 75 is preferably adapted for recording audio information twice, as for instance on two separate RAM devices, so as to achieve voice over effects by playing the contents of both RAM devices simultaneously. This technique is well known in the audio engineering art but not in an audio book and is therefore considered novel. It should be noted that the use of RAM devices herein also implies the use of alternative solid state storage devices such as programmable read devices such as PROM's and EPROM's.

The means for control further comprises a means for switching 86, such as the slide switch shown, between a recording mode and playback mode as is well known in voice recorders. In the preferred embodiment, the switching means 86 comprises a recessed switch which may only be accessed by a long pointed object such as the tip of a ballpoint pen. Thus, the recorded information may only be recorded by an adult, etc. Preferably, the means for control further comprises a button adapted for initiating playback of a voice message 87 as might be used for providing instructions, encouragement, praise, etc. information recorded in a RAM device of the circuit. The circuit 70 further comprises a key lock circuit 88 adapted for preventing recording of audio information so as to prevent the loss of recorded information through recording over it. Such locking circuits 88 are well known in the art.

Figure 3:
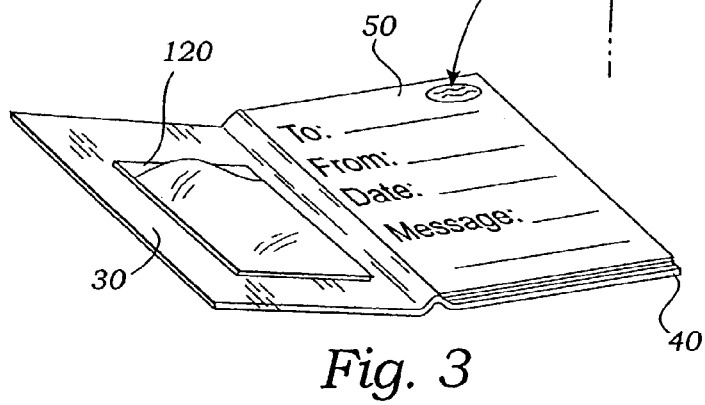
FIG. 3 is a perspective view thereof showing a means for personalizing a storybook part of the invention.

As shown in FIG. 3, the storybook 10 preferably provides at least one personalizing visual element such as one or more transparent pockets 120 for receiving a photograph, or any other method of affixing one or more photographs within the storybook 10. This pocket 120 is preferably adhered on the inside front cover surface of the book 10 and is meant for a photo of the young reader, his/her parent, grandparent etc. The young person may therefore have a parent figure read a bedtime story to them in their own voice while the young person looks at the story pages and the photo of the parent figure. Personalization of the book 10 is accomplished through the use of a series of inscription lines on the inside front cover or first page which might include a place to right the names of a book gift giver, and the receiver, a date of the gift and a message.

The method of the present invention comprises the steps of: providing the storybook 10 having a binding 20 engaging plural pages 50 between opposing book covers 30, 40; providing an audio recorder 60 integral with the storybook 10 and enabled for receiving, storing and playing audio information; recording a permanent or impermanent first audio information in the audio recorder 60 for each one of the plural pages; recording a second permanent or impermanent audio information in the audio recorder 60 for each one of the plural pages; and providing plural operating buttons 85 each adapted for visual correspondence with one of the plural pages 50 and for playing the first and second audio information associated with any one of the plural pages 50 simultaneously. The method may further include the step of mounting the audio recorder 60, audio information and the operating buttons 85 impermanently to the storybook 10 and later dismounting the audio recorder 60, audio information and the operating buttons 85 from the storybook 10; and mounting the audio recorder 60, audio information and the operating buttons 85 to a further storybook 10. The advantage to this is that the same background music, stored as a first audio information portion, may be carried from book to book to provide a common theme throughout, while the second or further audio information portion may be changed to fit each storybook as necessary or desired.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising: a book having a binding engaging plural pages between opposing book covers; an audio recorder enabled for receiving, storing and playing audio information, a means for control including plural operating buttons, the operating buttons each adapted for visual correspondence with one of the plural pages; each of the operating buttons further adapted for playing at least one portion of the audio information corresponding to the one of the plural pages; at least one of the buttons enabling the playing of two portions of the audio information simultaneously; the control means removably engagable with said book covers; and a switching means comprises a recessed switch inaccessible to a finger for switching between recording mode and playback mode.

2. The apparatus of claim 1 wherein the control means further comprises a microphone circuit for receiving the audio information.

3. The apparatus of claim 1 wherein the control means further comprises a headphone circuit for directing the audio information to a headphone.

4. The apparatus of claim 1 wherein tho control means further comprises an audio output circuit adapted for presenting the audio information audibly.

5. The apparatus of claim 4 wherein the control means is enabled for lockout of the recording mode using the switching means.

6. The apparatus of claim 1 wherein the control means is enabled for playing a voice message.

7. An apparatus comprising: a book having a binding engaging plural pages between opposing book covers; an audio recorder enabled for receiving, storing and playing audio information; a means for control including plural operating buttons, the operating buttons each adapted for visual correspondence with one of the plural pages; each of the operating buttons further adapted for playing at least two separate portions of the audio information simultaneously; and a mode switching means comprising a switch inaccessible to a finger for switching between recording mode and playback mode.

8. The apparatus of claim 7 wherein a first portion of the audio information is permanent and a second portion of the audio information is impermanent.

9. The apparatus of claim 7 wherein the control means further comprises a microphone circuit for receiving the audio information.

10. The apparatus of claim 7 wherein the control means further comprises a headphone circuit for directing the audio information to a headphone.

11. The apparatus of claim 7 wherein the control means further comprises an audio output circuit adapted for presenting the audio information audibly.

12. A method comprising the steps of: providing a book having a binding engaging plural pages between opposing book covers; providing an audio recorder integral with the book and enabled for receiving, storing and playing audio information; recording at least two portions of audio information in the audio recorder for each one of the plural pages; and providing plural operating buttons each adapted for visual correspondence with one or the plural pages and for playing one of the first and second portions of the audio information simultaneously; and providing a switching means comprising a switching means inaccessible to a finger for switching between recording mode and playback mode.

13. The method of claim 12 wherein the step of recording the at least two portions of audio information includes one of the portions recorded permanently and another of the portions recorded impermanently.

* * * * *